United States Patent [19]

Jidell

[11] Patent Number: 4,925,383
[45] Date of Patent: May 15, 1990

[54] MACHINE FOR MANUFACTURING OF FLAT PRODUCTS

[75] Inventor: Bernt Jidell, Nyköping, Sweden

[73] Assignee: ABECE AB, Sweden

[21] Appl. No.: 271,759

[22] PCT Filed: Apr. 24, 1987

[86] PCT No.: PCT/SE87/00212

§ 371 Date: Jan. 13, 1989

§ 102(e) Date: Jan. 13, 1989

[87] PCT Pub. No.: WO87/06873

PCT Pub. Date: Nov. 19, 1987

[30] Foreign Application Priority Data

May 13, 1986 [SE] Sweden .................. 86021565

[51] Int. Cl.$^5$ .................................................. B28B 5/02
[52] U.S. Cl. ................................. 425/453; 198/476.1; 425/253; 425/308; 425/452
[58] Field of Search ........... 198/475.1, 476.1, 477.1, 198/465.3, 803.14, 802, 803.2; 425/253, 255, 256, 308, 452, 470, DIG. 117, DIG. 118, DIG. 202, 453

[56] References Cited

U.S. PATENT DOCUMENTS

| 1,428,721 | 9/1922 | Towne | 198/477.1 |
| 1,871,276 | 8/1932 | Paterson et al. | 198/477.1 |
| 3,257,701 | 6/1966 | Lang | 425/DIG. 118 |
| 3,306,421 | 2/1967 | Buttery | 198/477.1 X |
| 3,465,395 | 9/1969 | Cushwa | 425/452 X |
| 3,631,574 | 1/1972 | Chapman | 425/470 |
| 3,701,406 | 10/1972 | Aasted | 198/477.1 |
| 4,758,148 | 7/1988 | Jidell | 425/452 X |

FOREIGN PATENT DOCUMENTS

| 60-31421 | 2/1985 | Japan | 198/477.1 |
| 144538 | 3/1954 | Sweden . | |
| 148389 | 1/1955 | Sweden . | |
| 337339 | 8/1971 | Sweden . | |
| 160527 | 9/1971 | Sweden . | |
| 427815 | 5/1983 | Sweden . | |

Primary Examiner—Richard L. Chiesa
Attorney, Agent, or Firm—Watson, Cole, Grindle and Watson

[57] ABSTRACT

A machine is provided for manufacturing moulding trays. Each bed plate is connected between two parallel endless conveying chains such that each is downwardly turnable as it passes over rear chain wheels. Carrying rollers are fixed to the rear of each bed plate. A guiding means is arranged between upper and lower parts of the chains for guiding the rollers during the downward turning. A supporting track is provided beneath the lower part of the chains. Thus, the present invention conserves the space in the conveying direction while conveying the bed plates in the direction of the lower part of the chains by the connecting means and by the carrying rollers contacting the supporting track.

9 Claims, 5 Drawing Sheets

MACHINE FOR MANUFACTURING OF FLAT PRODUCTS

TECHNICAL AREA

The present invention relates to a machine for manufacturing of flat concrete products upon separate moulding trays, at which the moulding trays by help of an endless conveyor are moved in closed succesion below and passing a concrete feeding station, where a concrete mass in a continuous layer is deposited, compacted and shaped on the passing moulding trays. The moulding trays further pass a severing device for severing the concrete layer between the separate moulding trays, before they, and the belonging shaped and product-forming concrete mass positions, are removed from the machine. The conveyor comprises a plurality of interconnected, and for carrying the moulding trays in a pre-determined position, adapted bed plates, which at least at the passing the concrete feeding station are moved over a supporting bed. The bed plates are arranged between a pair of endless, parallel and in syncrony operated conveyor chains, which are passing a front pair of chain wheels at the entrance portion of the machine and rear pair of chain wheels at the outlet-portion, whereby each bed plate is connected to the two conveyor chains by help of a pair of co-axial pivots in order to be individually moved ahead over the supporting bed.

The invention is not restricted to a special form of the bed plates and not even to conveyor chains in a narrow meaning provided with pivots for mounting of the bed plates, but can be related to different forms of the bed plates; e.g. wires or belts instead of conveyor chains and other mounting devices instead of pivots.

BACKGROUND OF THE INVENTION

The most common example of a flat concrete product, which is supposed to be manufactured in the machine in accordance with the invention, is a roof tile, whose top side as a rule shows linear generatrixes in its length direction, while its cross-section shows a wave-formed profile. Most frequently the roof tiles occurs as single- or double-cupped roof tiles, but a great number of variants will occur. The under side of the roof tile always is provided with knobs for mounting of the roof tile. The thickness of the roof tile can vary depending on its strength resistance, density and e.g. eventual suspension means. The manufacturing of concrete roof tiles are almost exclusively made by so called extrudation. This means that the concrete mass is compacted in a device including a rotary roller followed by a so called compacting block, which contacts the concrete, which is applied to the top side of the moulding trays in the machine. The demand for compacting of the concrete mass is considerable. In most countries standard demands of around 150–250 kg linear load on each cured roof tile occur together with a demand of a complete watertightness. The average thickness of the roof tile varies from 10 mm to around the dubble thickness at the knobs for the mounting of roof tile. This results in a considerable compacting force on the moulding tray when passing below the compacting unit.

An example of a machine in accordance with the preamble above is described in the Swedish patent publication SE 427 815. The machine in accordance with this patent publication is based upon two parallel chains which continuously pull the bed plates through the machine below a compacting unit, which consists of a rotating roller, and which is followed by a compacting block. The chains are standard roller chains, which have been provided with special links by which the bed plates are mounted to the chains. A special link and a number of standard links thereby show the same length as a roof tile. Each moulding tray is carried by two bed plates, at which the front bed plate is linked connected to the chains and at which the two other bed plates are linked connected to the first bed plate to make it for the bed plates to follow the chain around the chain wheel which are arranged at the two ends of the machine.

The Swedish patent publication SE 337 339 shows a similar machine for continuous manufacturing of roof tiles. The bed plates are, in accordance with this patent publication, not moved ahead by chains or the similar, but the plates are interconnected to one chain, at which threebed plates together will be used to support one moulding tray. Similar machines are known from the Swedish patent publications SE 160 527, SE 148 389 and SE 144 538.

A drawback with the known machines is that the bed plates in these can not be made with a length such that a moulding tray can be supported by one bed plate. The reason is that a too long bed plate can not be moved over a chain wheel, without projecting in the row of moulding trays passing through the machine, if this chain wheel will not have a relatively large diameter. This makes the machine space demanding and heavy. Another drawback consists in that several linked bed plate segments have links which will be torn out, and reducing precision in placing the moulding trays on the bed plates.

DESCRIPTION OF THE INVENTION

The purpose with the present invention is to achieve a machine for making flat concrete products which will not show the drawbacks of the known machines. In the machine in accordance with the invention the concrete products are produced upon separate moulding trays, at which the moulding trays are moved in closed succession by help of an endless conveyor below and passing a concrete extruding station, where a concrete mass in a continuous layer is deposited, compacted and shaped on the passing moulding trays. Then these are moved ahead past a severing device for severing the continuous concrete layer between the separate moulding trays, before they and the belonging shaped and product-forming concrete mass portions are removed from the machine. The conveyor is comprising a plurality of interconnected, and for carrying the moulding trays in a pre-determined position, adapted bed plates, which at least at the passing of the concrete extruding station, are moved over a supporting bed. The bed plates are arranged between a pair of endless, parallel and in synchrony operated conveyor chains, which are passing a front pair of chain wheels at the entrance-portion of the machine and a rear pair of chain wheels at the outlet-portion of the machine. Each bed plate is connected to the two conveyor chains by help of two coaxial pivots in order to be moved ahead over the supporting bed.

The invention is characterized in that each bed plate after passing the concrete extruding station and the severing device is arranged in such a way that its rear part is turned downwards between the conveyor chains after its rear part has left the supporting bed, while its front part is to pass or is passing over the rear chain wheels suspended in the conveyor chains. Conveyor chains also can be referring to other means for power transmission, as e.g. wires and belts. In the similar way the pivots also can be related to other connecting means to the power transmission means. Each bed plate preferably is provided with a pair of carrying means, which are arranged on each side of the bed plate and at its rear part, and which, after the rear part has left the supporting bed, are arranged in that way that they each are indexing a guiding means on each side of the machine during the descending movement of the rear part.

Each carrying means is constituted by a carrying roller, which, at the descending movement, is passing through a guiding slot, wich is constituted between two guiding plates arranged in one vertical plane, which extend downwards from the supporting bed in the length direction of the machine. The guiding slot shows partly one upper opening, which is directed against the plane through the supporting bed, and partly a lower opening directed mainly against the ground plane or the floor plane upon which the machine is placed. The slot between the guiding plates shows a curvature which is located in a horizontal plane extending through the axis at each chain wheel at the outlet-portion, on a distance from the chain wheel corresponding the distance between each pivot at the front part of the bed plate and each carrying roller at the rear part of the bed plate, whereby the bed plate are brought into a mainly horizontal position during the passing of the carrying roller through the curvature of the slot. The guiding plates are constituted by a couple of first guiding plates and a couple of second guiding plates, at which each first guiding plate shows a horizontal portion which is passing into a first downwards inclining portion in the movement direction, and whereby each second guiding plate is arranged after the first guiding plate in the moving direction of the machine and shows a horizontal portion, which is located in the vertical direction somewhat above the horizontal portion of the first guiding plate, and further into a first downwards inclining portion, which is directed against the first inclining portion of the first guiding plate.

Each bed plate is moved in an opposite direction to the main movement direction of the machine after the passing over the rear chain wheel at the outlet-portion, partly suspended in the pivots in the conveyor chains, and partly supported by each carrying roller against a supporting track, which extends along the machine from the rear chain wheel at the outlet-portion to the front chain wheel at the inlet-portion. The front chain wheel is provided with a cylinder drum, against which the under side of each bed plate is supported when its front part is passing over the front chain wheel.

The supporting track for the bed plates shows a rising portion, which extends from the chain wheel at the outlet-portion and which passes into a horizontal portion, which extends to the chain wheel at the outlet-portion. Further the supporting track can show a brake device at the end of the track, which is effecting the rear part of the bed plate during its turning around the drum. Preferably the brake device is constituted by a spring portion at the end of the supporting track, which is bend with a curvature which mainly is connected to the track of the rear free part of the bed plate during its turning around the drum on the chain wheel at the inlet-portion.

In an alternative embodiment of the invention each carrying member is constituted by a carrying roller, which at the descending movement is transferred on to a rear swinging member, by help of which the carrying roller is guided ahead to a supporting track, whereby the swinging member is turned in synchrony with the rear chain wheel, and shows an extension from its turning center that the carrying roller moves along a circular track whith the same size as the circular track of its suspension point in the conveyor chain. The bed plate thereby is placed with its rear part with the carrying rollers at the front in the travelling direction along the supporting track at the lower side of the machine. At the front portion of the machine the carrying rollers are transferred on to a front swinging arm when leaving the lower supporting track to be moved up on to the upper supporting track, whereby this swinging arm cooperates with each front chain wheel of the conveyor chain mainly in the same way as at the rear chain wheel.

DESCRIPTION OF THE DRAWINGS

The invention is described below as an embodiment to the drawings enclosed.

DESCRIPTION OF THE PREFERRED EMBODIMENTS

Figure 1:
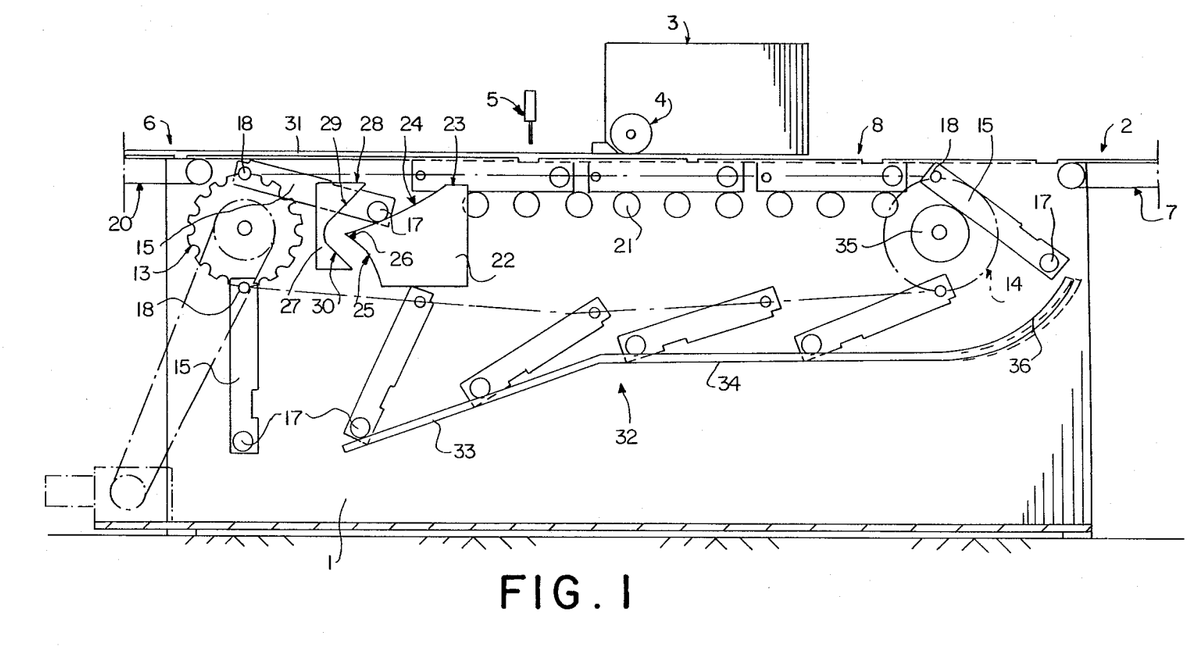
FIG. 1 shows schematically a side view of the machine in accordance with the invention.

As appears from FIG. 1 the moulding machine shown comprises a frame structure 1 supporting an inlet-end portion 2 to the right in the figure, a concrete extruding station 3 including a rotary pressing roller 4, a severing device 5 and an outlet-end portion 6 to the left on the figure. At the feeding-in station 2 moulding trays are supplied to the machine in order to then pass the latter in a direction towards the outlet-end portion 6. From the feeding-in station 2 the moulding trays are transferred one by one in close end to end succession by means of an auxiliary conveyor to a main conveyor 8, which carries the moulding trays during their passing below the concrete extruding station 3 and the severing device 5 following thereafter.

In the concrete extruding station 3 a stiff concrete mass, which is supplied to a hopper 9 from a concrete mixer, not shown, is deposited on each and all of the passing moulding trays, whereby the deposition of the concrete mass on the passing trays is effected by the rapidly rotated pressing roller 4 which concurrently subjects the concrete to a heavy compaction. The continuous layer of heavily compacted concrete mass then is divided by means of the severing device 5 in such manner that each moulding tray will carry its own product-forming concrete mass portion when it reaches the outlet end portion 6 of the machine.

Figure 2:
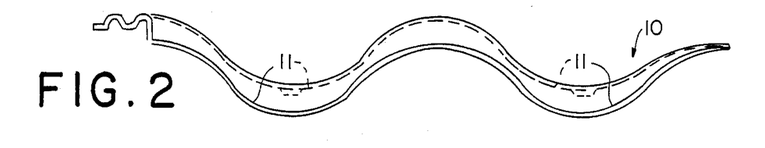
FIG. 2 shows in a greater graduation an end view of an example of a moulding tray which is proposed to be used in the machine.
Figure 3:
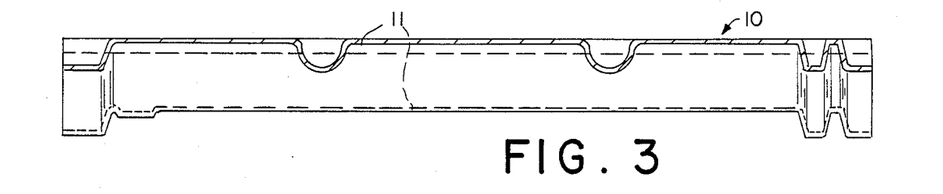
FIG. 3 shows a length-section of the moulding tray according to FIG. 2.

An example of a moulding tray to be used in the machine on FIG. 1 is shown on FIGS. 2 and 3. This tray 10 is made of sheet metal, preferably of steel, or aluminum having a uniform thickness, which by deep drawing and local embossing has been imparted such a configuration that its upper side 11 is complementary to the bottom side of the tile, while the lower side of the tray with only insignificant deviations follows the relief-like configuration of the upper side thereof. The deep drawing of the sheet metal results in a marked stiffening of the same, whereby the moulding tray thus formed will show a sufficient shape permanence even if made of a considerable thinner sheet metal, say one having a thickness of only 1-2 mm. The moulding tray may be provided with a further stiffening constituted by preferably downwardly bent margined portions for instance along its ends, its longitudinal sides or both. In an alternative embodiment, not shown on the figures, the moulding tray is made of die casted aluminum, whereby the shape of its upper side is independent of the shape of its under side.

Figure 4:
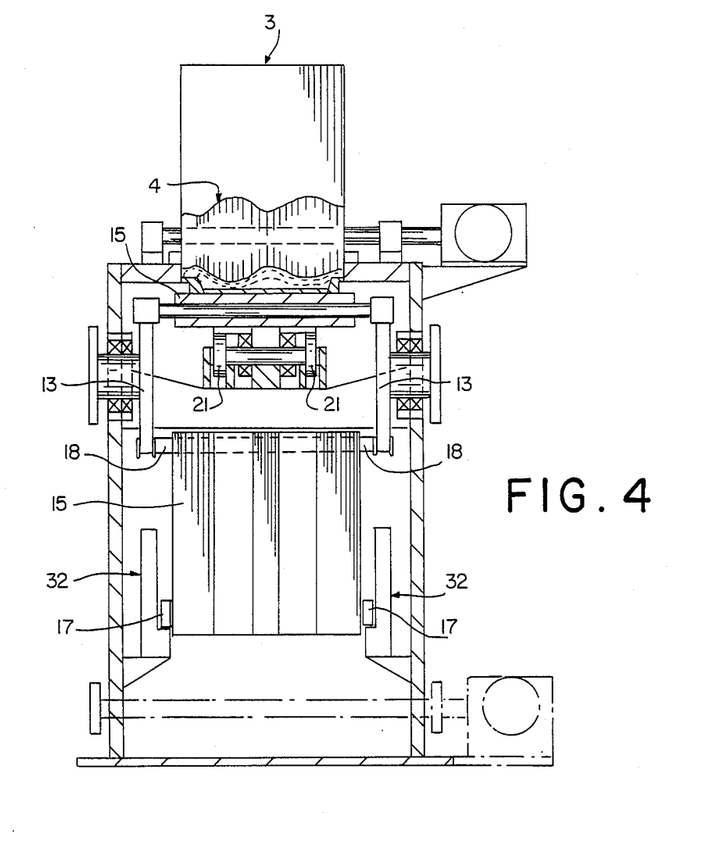
FIG. 4 shows in a greater graduation an end-view of the machine on FIG. 1.
Figure 5:
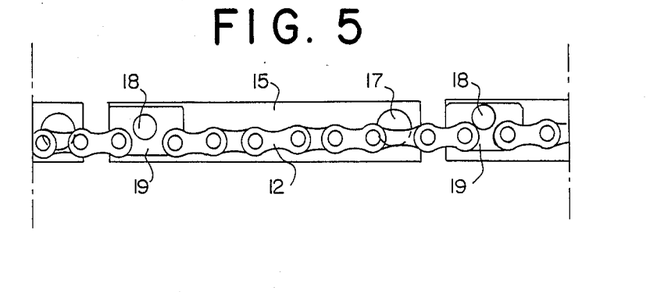
FIG. 5 shows a partial schematical side-view of the machine according to FIG. 1.
Figure 6:
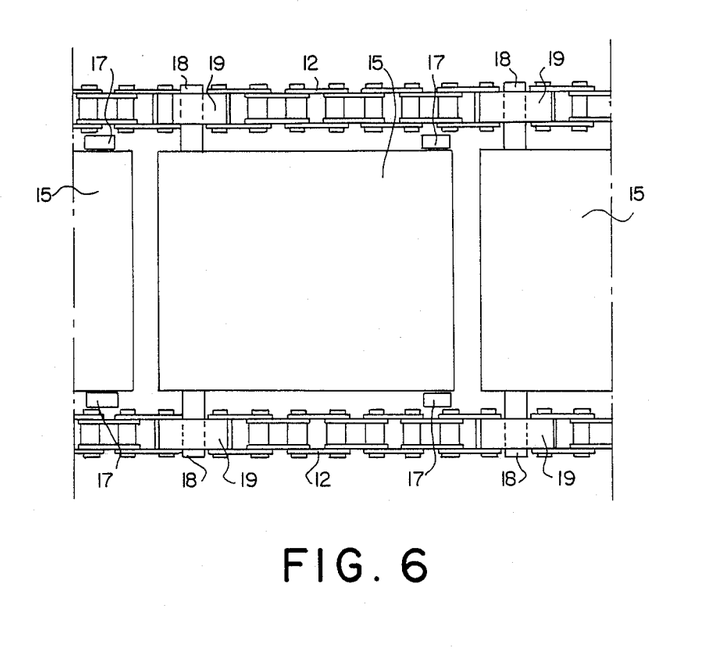
FIG. 6 shows the partial part of the machine according to FIG. 5 seen from above.

The main conveyor 8 of the machine is composed of two synchronously operating, endless driving chains 12, which is shown on FIGS. 4-6, which are in spaced parallel relationship run over and between two pairs of coaxial sprockets 13 and 14, of which the one pair 13 is driven by an electrical motor 16. Between the chains 12 there is placed a series of bed plates 15, serving as carriers for the moulding trays 10, when the letter are passing below the concrete extruding station 3. Each bed plate 15 is connected to the two driving chains 12 at the front part in the transmission direction of the bed plate 15 in a power transmitting way by means of a pair of coaxial pivots 18 having ends journalled in special links 19 inserted in the two driving chains at uniformed intervals generally corresponding to the length of the moulding trays 10. Further each bed plate 15 is provided with two carrying rollers 17 arranged on each side of the plate at its end portion in the movement direction. In the machine according to the example each moulding tray 10 is resting upon two adjacent bed plates 15. The leading bed plate in the movement direction of the machine is transferring a pulling force to the moulding tray 10 while the trailing bed plate 15 is only carrying the end portion of the moulding tray 10. In an alternative embodiment of the invention, not shown, each moulding tray can be carried by one single bed plate.

The foremost end portion of the bed plates 15 follow a path determined by the driving chains 12. All this contributes to a pattern of movement of the bed plates 15 of the main conveyor 8 which ensures a trouble-free engagement between the bed plates 15 and the moulding trays 10 at the inlet end 2 of the machine as well as to an equally trouble-free disengagement of the moulding trays at the outlet end of the machine to an out-feed conveyor 20, which is still more important because the moulding trays are then carrying the newly moulded and thus very fragile product-forming concrete mass portions.

The bed plates 15 are supported at their passing the concrete extruding station by a couple of supporting rollers 21, whereby the distance between two pairs of rollers is arranged in that way that two pairs of rollers always are supporting each bed plate 15. When a bed plate 15, during its movement to the left on FIG. 1, has reached a position in which its rear part just are to leave the last pair of supporting rollers 21 in the movement direction, the two carrying rollers 17 at the rear part of the bed plate 15 are aligning to each first guiding plate 22 on each side of the path of bed plates 15. Each first guiding plate 22 shows a horizontal portion 23, which in the movement direction is passing into a first downwardly inclining portion 24 and further into a second inclining portion 25 in cleaning against the last one, which makes the guiding plate showing a tip 26 in the main movement direction of the machine. A second guiding plate 27 is arranged after each first guiding plate 22 in the main movement direction of the machine and shows a horizontal portion 28, located vertically somewhat above the horizontal portion 23 of the first guiding plate 22, a first downwardly inclining portion 29, which is directed against the first downwardly inclining portion 24 on the first guiding plate 22, and a second inclining portion 30 in cleaning against the last one, which is directed against the second inclining portion 25 of the first guiding plate 22. The two guiding plates 22, 27 by that is forming a slot, first inclining downwardly in the main movement direction of the machine and then bending sharply and inclining against the main movement direction. The guiding plates 22, 27 preferably are made of hard rubber partly to provide good resistance against wearing and a low sound level.

By influence of the gravitation the rear part of the bed plate 15 moves downwardly when the carrying rollers 17 are passing in one slot each between the guiding plates 22, 27 on the same time as the front portion of the bed plate is passing the rear chain wheel 13. When the carrying rollers 17 of the bed plate 15 has passed out from the slot between the guiding plates 22, 27, its rear portion is swinging downwards making the bed plate 15 hanging in its pivots 18, by which it is connected to the special links 19 in the chains 12 of the main conveyor 8. The carrying rollers 17 are supported during the passing through the slot at first against the first inclining portion 24 on the first guiding plate 22 while the pivots 18 of the bed plate 15 are moved 90° along the rear chain wheels 13 from their uppermost point. During the remaining part of the passing through the slot the carrying rollers 17 are supporting against the second inclining portion 30 of the second guiding plate 27 during a movement of another 90° of the pivots 18 along the rear chain wheels 13. The moulding tray 10 carried by the bed plate 15 is transferred to two carrying rims 31 extending in the main movement direction of the machine on each side of the path of bed plates 15 simultaneously with the downwardly passing of the actual bed plate 15 at the rear chain wheel 13. The moulding tray 10, which carries a newly manufactured, not yet hardened roof tile, is then pushed out upon the outfeed conveyor 20 by a following moulding tray 10 which is carried by a following bed plate 15.

After a bed plate 15 has past the rear chain wheel 13 it is returned in the opposite direction to the main movement direction of the machine, first freely hanging in the chains 12 and after a certain movement, hanging with the carrying rollers 17 running along a supporting track 32 arranged on each side of the pass of bed plates 15. The supporting track 32 shows an upwardly inclining portion 33 which is passing into a horizontal portion 34 extending below the front chain wheels 14. When a bed plate 15 is located close to the front chain wheel 14 its platform is inclining 45° against the horizontal plane. At the passing of the pivots 18 around the periphery of the front chain wheels 14 the bed plate 15 is supported by a cylinder drum 35 whereby the plate becomes a soft transmission movement from its lower, upside down, inclining position into its horizontal position in which it passes the concrete extruding station 3. The horizontal portion 34 on the supporting track 32 is passing into a springing portion 36 at the end of the track, which is bent with a bending mainly the same as the orbit of the rear free part of the bed plate 15 when passing over the drum 35 at the front chain wheel 14. During the movement around the drum 35 the free part of the bed plate 15 is forced against a springing portion 36 of the supporting track, whereby the plate is kept in continuous contact with the drum 35 without ramming the same. The diameter of the drum 35 is chosen in such a way that the bed plate 15 is rolling over the drum 35 without sliding. Thus no wearing will appear on the underside of the bed plate 15.

Figure 7:
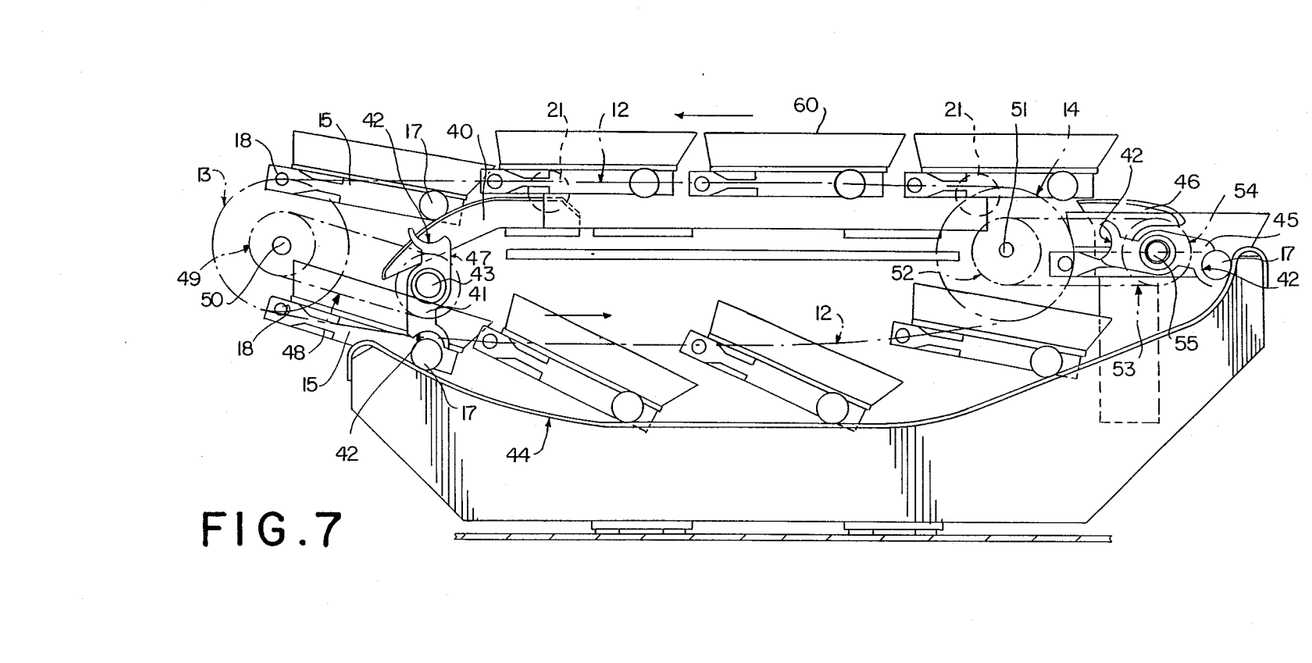
FIG. 7 shows a schematical side-view of an alternative embodiment of the machine according to the invention.
Figure 8:
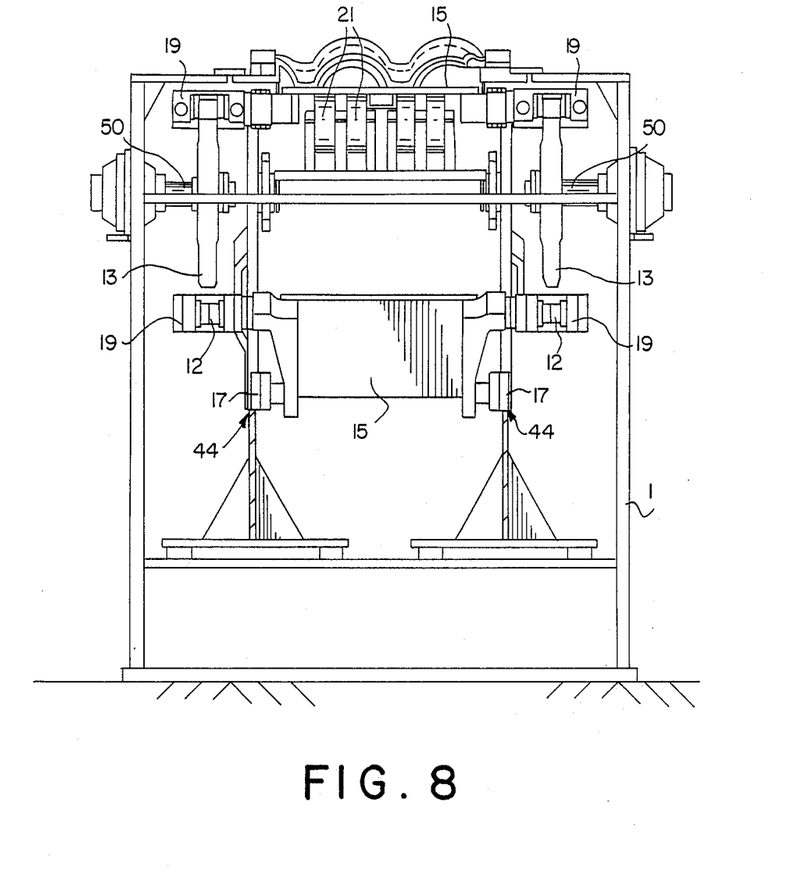
FIG. 8 shows an end-view of the machine on FIG. 7.

In the alternative embodiment of the invention according to FIGS. 7 and 8, in which the bed plates 15 are moved on supporting rollers 21, the bed plates 15 are turned downwardly at its rear part in the movement direction at leaving the last supporting rollers. Each bed plate is equipped with a carrier 60 for carrying a moulding tray. In this embodiment there are four supporting rollers in each group. The two supporting rollers 17 at the rear part of the bed plate 15 is passing on to one rear guide 40 each arranged on each side of the path of bed plates 15. Each rear guide 40 is inclining downwardly in the movement direction from the plane through the supporting rollers 21 and is connected to a rear swinging arm 41 to which the carrying roller 17 is transferred when leaving the rear guide 40. The rear swinging arm 41 is arranged in front of the rear chain wheel 13 in the main movement direction of the machine and shows two portions with the same length and directed from each other at which ends seats 42, corresponding the form of the carrying rollers 17, are arranged with the openings directed out from the center of the swinging arm 41. The two rear swinging arms 41 are arranged on a joint axis 43, which is powered in synchrony by the chains 12.

When the carrying rollers 17 are leaving each rear guide 40 these are controlled brought downwards besides the rear part of the bed plate 15 simultaneously as the front part of the bed plate 15 is passing over the rear chain wheel 13. The two parts of the swinging arm 41 have such an extension that the distance from the center of its joint axis 43 to the center of the carrying roller 17, when the letter is resting on the seat 42 on the swinging arm 41, is the same as the diameter of the rear conveyor wheel 13 at the front pivots 18. The bed plate 15 has a parallel movement when lowered into the machine, at which its rear part with the carrying rollers 17 is directed mainly against the front portion of the machine. The carrying rollers 17 are carried by each swinging arm 41 until each roller 17 reaches one supporting track 44 mainly arranged parallel with each freely suspended conveyor chain 12 on the lower side of the machine. At a continuous movement of the conveyor chain 12 the bed plate 15 is moved with its rear part in the front of the movement direction until reaching the front portion of the machine.

A front swinging arm 45 is arranged before the front chain wheel 14 in the main movement direction of the machine and is made the same way and is working the same way as the rear swinging arm 41. Therefore the bed plate 15 becomes a parallel movement when rising up to the plane through the supporting rollers 21. When the carrying rollers 17 on the bed plate 15 are leaving the front swinging arm 45 the rollers 17 are transferred to one front guide 46 each, located on each side of the machine and inclining against the plane through the supporting rollers 21. After that the bed plate 15 again is brought ahead over the supporting rollers 21.

The carrying rollers 17 preferably can be divided into two independently rotating halves. The inner halves thereby can be brought to abut the guides 40, 46 while the outer halfes can be brought to abut the seats 42 on the swinging arms 41, 45.

The operation of the machine in the alternative embodiment according to FIGS. 7 and 8 is made by help of an electrical motor, not shown on the figures, which is connected to the axis 43 of the rear swinging arm 41. This axis 43 is provided with two first chain wheels 47, which each is arranged along the sides of the machine and connected through a rear driving chain 48 with a second chain wheel 49 each, which is connected to one rear conveyor wheel 13 each. The rear conveyor wheels 13 are each arranged on a rear pivot 50 which are carried in the frame structure 1 of the machine, and make the bed plates 15 passing them between. The first chain wheels 47, the second chain wheels 49 and the connecting rear driving chains 48 are only shown with dotted lines in FIG. 7, but are left in FIG. 8 as the rear swinging arms 41 on the axis 43.

Through the conveyor chains 12 the operating movement is transferred from the driving motor to the front conveyor wheels 14, which are arranged on a joint axis 51. This axis 51 also is provided with two third chain wheels 52, which are arranged along the sides of the machine and connected by a front driving chain 53 to a fourth chain wheel 54 each, which is arranged upon a rear pivot 55 each. Each fourth chain wheel 54 is connected to each front swinging arm 45 arranged on the same rear pivot 55. By that the bed plates 15 can pass between the front swinging arms 45. The third chain wheels 52, the fourth chain wheels 54 and the connecting front driving chains 53 are shown by dotted lines on FIG. 7.

I claim:

1. A machine for manufacturing flat concrete products upon separate moulding trays which are moved in close succession from an inlet portion of the machine to an outlet portion of the machine, the machine comprising:

an endless conveyor comprising a pair of parallel and synchronously operated endless conveying chains, a front pair of rotating chain wheels located at the inlet portion, and a rear pair of rotating chain wheels located at the outlet portion, said pair of endless chains passing over said front and rear pair of chain wheels and an upper part of the chains being conveyed in a first direction from the inlet to the outlet;

a plurality of inter-connected bed plates for carrying the moulding trays in a predetermined position;

means for connecting a front part of each bed plate between the pair of endless conveyor chains such that a rear part of each bed plate is downwardly turnable as the front part passes over the pair of rear chain wheels;

a pair of carrying rollers located at the rear part of each bed plate;

means for guiding the carrying rollers during the downward turning of the rear part, said guiding means arranged between upper and lower parts of the conveying chains behind the rear wheels in the first conveying direction; and a supporting track extending in a second conveying direction from approximately below the rear chain wheels to approximately below the front chain wheels;

whereby each bed plate may be conveyed in the second conveying direction from the outlet to the inlet by said connecting means and by said carrying rollers contacting said supporting track.

2. A machine according to claim 1, further comprising a cylindrical drum connected to each front wheel to support each bed plate as it passes over the pair of front wheels.

3. A machine according to claim 2, further comprising a brake device located on said supporting track near the pair of front wheels, said brake device braking each bed plate as it is supported by said cylindrical drums.

4. A machine according to claim 1, wherein said guiding means defines a guiding slot having an upper portion which declines in the first conveying direction and a lower portion which declines in the second conveying direction.

5. A machine according to claim 4, wherein the guiding slot defines a curvature located in a vertical plane extending through a rotating axis of each rear chain wheel, the curvature being a distance from a front portion of each rear chain wheel corresponding to a distance between said connecting means and said carrier roller, whereby each bed plate is oriented in a mostly horizontal position during guiding of said carrying roller through the guiding slot.

6. A machine according to claim 5, wherein said guiding means comprises first and second guiding plates, the first guiding plate having a first portion declining in the first conveying direction, and the second guiding plate having a first portion declining in the first conveying direction, the second guiding plate located above the first guiding plate such that the first portions of the first and second guiding plates define a portion of the guiding slot therebetween.

7. A machine according to claim 6, wherein the first and second guiding plates further have respective second portions which decline in the second conveying direction, the second guiding plate being located forward of the first guiding plate in the first conveying direction, such that the second portions of the guiding plates define another portion of the guiding slot therebetween.

8. A machine according to claim 1, wherein said guiding means comprises rear guides which decline in the first conveying direction and rear swinging arms arranged forward of the rear guides in the first conveying direction, the rear swinging arms having seats at opposite ends thereof for receiving said carrying rollers and rotating synchronously with the pair of rear chain wheels, the seats of each rear swinging arm being distanced from each other such that a distance from the rotational axis of the rear swinging arm to the center of the received carrying roller is equal to the diameter of the rear chain wheels, whereby the rear guides and the rear swinging arm carry the carrying rollers parallel relative to the conveying directions as said connecting means passes over the rear chain wheels and transfer the carrying rollers to said supporting track.

9. A machine according to claim 1, wherein said supporting track is inclined in the second conveying direction near the front chain wheels and further comprising forward swinging arms arranged forward of the front chain wheels in the second conveying direction, said forward swinging arms having seats at opposite ends thereof for receiving said carrying rollers and rotating synchronously with said front chain wheels, the seats of each forward swinging arm being distanced from each other such that a distance from the rotational axis of the forward swinging arm to the center of the received carrying roller is equal to the diameter of the forward chain wheels, whereby the inclined portion of said supporting track and the forward swinging arms carry the carrying rollers parallel to the conveying directions as said connecting means passes under the forward chain wheels.

* * * * *